United States Patent
Thanneeru et al.

(10) Patent No.: US 11,223,560 B2
(45) Date of Patent: Jan. 11, 2022

(54) SYSTEM AND METHODS FOR UNIFIED COLLECTION OF NETWORK INFORMATION

(71) Applicant: Verizon Patent and Licensing Inc., Arlington, VA (US)

(72) Inventors: Sudarshan R. Thanneeru, Ashburn, VA (US); Praveen K. Nidumolu, Reston, VA (US); Srinivas Soma, Tampa, FL (US); John E. Pries, Hillliard, OH (US); Randolph Torres, Clermont, FL (US); Raman P. Jankiram, Chennai (IN)

(73) Assignee: Verzon Patent and Licensing Inc., Basking Ridge, NJ (US)

( * ) Notice: Subject to any disclaimer, the term of this patent is extended or adjusted under 35 U.S.C. 154(b) by 147 days.

(21) Appl. No.: 16/546,764

(22) Filed: Aug. 21, 2019

(65) Prior Publication Data
US 2021/0058323 A1    Feb. 25, 2021

(51) Int. Cl.
| *H04L 12/741* | (2013.01) |
| *H04W 40/20* | (2009.01) |
| *H04L 12/725* | (2013.01) |
| *H04L 12/24* | (2006.01) |
| *H04L 12/26* | (2006.01) |
| *H04L 12/781* | (2013.01) |
| *H04L 12/28* | (2006.01) |

(52) U.S. Cl.
CPC ........ *H04L 45/745* (2013.01); *H04L 45/3065* (2013.01); *H04W 40/20* (2013.01); *H04L 2212/00* (2013.01)

(58) Field of Classification Search
CPC .............. H04L 45/745; H04L 45/3065; H04L 2212/00; H04L 41/0226; H04L 43/065; H04L 41/022; H04L 45/52; H04L 12/2856; H04W 40/20
See application file for complete search history.

(56) References Cited

U.S. PATENT DOCUMENTS

| 6,185,288 | B1* | 2/2001 | Wong ...................... H04L 29/06 370/352 |
| 6,684,121 | B1* | 1/2004 | Lu ......................... G05B 23/027 700/108 |
| 7,193,968 | B1* | 3/2007 | Kapoor ................. H04L 43/022 370/235 |
| 7,231,403 | B1* | 6/2007 | Howitt .................... H04L 41/00 |
| 8,275,313 | B1* | 9/2012 | Myers ............... H04W 52/0206 455/41.2 |
| 9,525,606 | B1* | 12/2016 | Staggs .................... H04L 69/22 |
| 9,619,989 | B1* | 4/2017 | Ewing .................. G08B 21/245 |

(Continued)

*Primary Examiner* — Harry H Kim

(57) ABSTRACT

Systems and methods provide a unified collection service for a network. A first network device receives a data reporting message from a data reporting device. The data reporting message includes a first format for a particular data reporting device. The first network device adds routing data to the data reporting message to create an encapsulated data reporting message and forwards the encapsulated data reporting message to a second network device. The second network device transforms the encapsulated data reporting message into a second format that includes a unified message format and forwards, based on the routing data, the unified data reporting message.

19 Claims, 10 Drawing Sheets

(56) References Cited

U.S. PATENT DOCUMENTS

| | | | |
|---|---|---|---|
| 10,425,355 B1* | 9/2019 | Manoukian | H04L 67/10 |
| 10,540,867 B1* | 1/2020 | Shrikhande | H04L 43/0817 |
| 2002/0120697 A1* | 8/2002 | Generous | H04L 67/306 |
| | | | 709/206 |
| 2004/0167912 A1* | 8/2004 | Tsui | G06F 16/958 |
| 2006/0002522 A1* | 1/2006 | Bettis | H04M 3/533 |
| | | | 379/88.22 |
| 2006/0106941 A1* | 5/2006 | Singhal | H04L 67/2823 |
| | | | 709/238 |
| 2006/0129650 A1* | 6/2006 | Ho | H04L 67/2804 |
| | | | 709/207 |
| 2009/0115626 A1* | 5/2009 | Vaswani | G01D 4/004 |
| | | | 340/870.02 |
| 2012/0039332 A1* | 2/2012 | Jackowski | H04L 47/2441 |
| | | | 370/389 |
| 2013/0204450 A1* | 8/2013 | Kagan | H04L 67/06 |
| | | | 700/291 |
| 2014/0075458 A1* | 3/2014 | Wright | G06F 9/451 |
| | | | 719/321 |
| 2014/0244769 A1* | 8/2014 | Sakuta | H04L 51/24 |
| | | | 709/206 |
| 2014/0351318 A1* | 11/2014 | Friedrich | H04N 21/2362 |
| | | | 709/203 |
| 2016/0342571 A1* | 11/2016 | Lane | H04L 51/14 |
| 2017/0005954 A1* | 1/2017 | Shaltiel | H04L 51/02 |
| 2019/0268310 A1* | 8/2019 | Guberman | H04W 4/20 |
| 2020/0201731 A1* | 6/2020 | Levy | G05D 1/0027 |
| 2020/0334696 A1* | 10/2020 | Ansari | H04L 67/22 |

* cited by examiner

```
{
  "v2": {
    "operation": "relay",
    "message": {
      "topic": "bp.aeprocessor.v2_0.alarms",
      "body": {
        "version": 1,
        "header": {
          "envelopeId": "55b0e5ea-f8a1-55e0-8ad5-xxxxxxx",
          "timestamp": "2019-07-02T15:21:50Z",
          "traceId": "5f5b180e-5150-55aa-a5f8-xxxxxxxxxdb",
          "upstreamId": "88dd5f5fa555e0c55555f5558b1fe555-xxxxxxxx"
        },
        "event": {
          "_type": "bp.v1.alarmSuperseded",
          "alarm": {
            "data": {
              "id": "-51585555xyz155xyz15",
              "type": "FilteredAlarm",
              "attributes": {
                "id": "-51585555xyz155xyz15",
                "alarm-id": "-51585555xyz155xyz15",
                "node-id": "a1555555-8810-55b5-5558-cd80155555e",
                "ra-alarm-id": "0100000000-0000-xxxx",
                "node-type": "1111",
                "state": "ACTIVE",
                "resource": "SP-1-15",
                "resource-id": "SP-1-15",
                "native-condition-type": "PMFTPF",
                "condition-severity": "INFO",
                "service-affecting": "NON_SERVICE_AFFECTING",
                "manual-clearable": true,
                "additional-text": "file 'sftp://ftpUser@111.111.11.55:5555/bp5/data/XxxXXX1XXxXxxXXxxXXxA0MTdC--15_MINUTES--80888888-5afe-888-aa15-f8888c88d88a--155555588015.xx' has failed",
                "first-raise-time": "2019-05-31T00:17:51.000Z",
                "last-raise-time": "2019-07-02T13:20:37.000Z",
                "number-of-occurrences": 855,
                "acknowledge-state": "NOT_ACKNOWLEDGED",
                "device-id": "88888888-5afe-8888-aa15-f8888c88d88a",
                "device-name": "XXXXXXXXX-01010101B",
                "mac-address": "XX:1A:01:1C:11:11",
                ...

"affected-inventory-ids": [],
                "sequence-id": "1555555555550"
              }
            }
          }
        }
      }
    }
  }
}
```

```
{
 "ucgSource": "XYZDATA",
 "ucgRawData": "{\"data\":{\"id\":\"-51585555xyz155xyz15\",\"type\":\"FilteredAlarm\",\"attributes\":{\"id\":\"-51585555xyz155xyz15\",\"alarm-id\":\"-51585555xyz155xyz15\",\"node-id\":\"a1555555-8810-55b5-5558-cd80155555e\",\"ra-alarm-id\":\"0100000000-0000-xxxx\",\"node-type\":\"1111\",\"state\":\"ACTIVE\",\"resource\":\"SP-1-15\",\"resource-id\":\"SP-1-15\",\"native-condition-type\":\"PMFTPF\",\"condition-severity\":\"INFO\",\"service-affecting\":\"NON_SERVICE_AFFECTING\",\"manual-clearable\":true,\"additional-text\":\"file 'sftp://ftpUser@111.111.11.55:5555/bp5/data/XxxXXX1XXxXxxXXxxXXxA0MTdC--15_MINUTES--80888888-5afe-888-aa15-f8888c88d88a--155555588015.xx' has failed\",\"first-raise-time\":\"2019-05-31T00:17:51.000Z\",\"last-raise-time\":\"2019-07-02T13:20:37.000Z\",\"number-of-occurrences\":855,\"acknowledge-state\":\"NOT_ACKNOWLEDGED\",\"device-id\":\"88888888-5afe-8888-aa15-f8888c88d88a\",\"device-name\":\"XXXXXXXXX-01010101B\",\"mac-address\":\"XX:1A:01:1C:11:11\",\"partition\":[\"e55f5d55-555c-5f55-55bb-c5c55a5c555e\"],\"additional-attrs\":{\"YEAR\":\"2019\",\"MODE\":\"NONE\",\"aidtype\":\"COM\",\"location\":\"NEND\",\"source\":\"1111:SP-1-15\",\"direction\":\"NA\",\"Condition Effect\":\"TC\"},\"affected-inventory-ids\":[],\"sequence-id\":\"1555555555550\"}}}",
 "ucgDeviceName": "XXXXXXXXX-01010101B",
 "ucgType": "LIVE",
 "ucgTopic": "persistent://enmv/xyz-alarms/ECLIPSE-XYZ-from-CLD-ALARM-2-sec-5055"
}
```

FIG. 7B

```
{
  "system": {
    "config": {
      "hostname": "",
      "domain-name": "",
      "login-banner": "",
      "motd-banner": ""
    },
    "state": {
      "hostname": "",
      "domain-name": "",
      "login-banner": "",
      "motd-banner": "",
      "current-datetime": "",
      "boot-time": 0
    }, ...
  "alarms": {
   "alarm": {
    "-51585555xyz155xyz15": {
      "id": "-51585555xyz155xyz15",
      "state": {
        "id": "-51585555xyz155xyz15",
        "resource": "SP-1-15",
        "text": "file 'sftp://ftpUser@111.111.11.55:5555/bp5/data/XxxXXX1XXxxXxxXXxxXXxA0MTdC--15_MINUTES--80888888-5afe-888-aa15-f8888c88d88a--155555588015.xx' has failed",
        "time-created": 0,
        "severity": "INFO",
        "type-id": "",
        "alarm_ref_id": "0100000000-0000-xxxx",
        "type": "",
        "class": "not applicable",
        "equipment": "not applicable",
        "AID": "COM",
        "condition_type": "not applicable",
        "location": "NEND",
        "direction": "NA",
        "HiSeverityNotificationCode": "not applicable",
        "LoSeverityNotificationCode": "not applicable",
        "ServiceEffect": "None",
        "CardType": "not applicable",
        "MACAddress": "XX:1A:01:1C:11:11",
        "IPAddress": "None",
        "deviceName": "XXXXXXXXX-01010101B",
        "rawAlarmText": "{\"data\": {\"id\": \"-51585555xyz155xyz15\",\"type\": \"FilteredAlarm\",\"attributes\": {\"id\": \"-51585555xyz155xyz15\",\"alarm-id\": \"-51585555xyz155xyz15\",\"node-id\": \"a1555555-8810-55b5-5558-cd80155555e\",\"ra-alarm-id\": \"0100000000-0000-xxxx\",\"node-type\": \"1111\",\"state\": \"ACTIVE\",\"resource\": \"SP-1-15\",\"resource-id\": \"SP-1-15\",\"native-condition-type\": \"PMFTPF\",\"condition-severity\": \"INFO\",\"service-affecting\": \"NON_SERVICE_AFFECTING\",\"manual-clearable\": true,\"additional-text\": \"file 'sftp://ftpUser@111.111.11.55:5555/bp5/data/XxxXXX1XXxxXxxXXxxXXxA0MTdC--15_MINUTES--80888888-5afe-888-aa15-f8888c88d88a--155555588015.xx' has failed\",\"first-raise-time\": \"2019-05-51T00:17:51.000Z\",\"last-raise-time\": \"2019-07-02T15:20:57.000Z\",\"number-of-occurrences\": 855,\ ... ,\"sequence-id\": \"1555555555550\"}}}",
        "time-created-str": "2019-05-31T00:17:51.000Z",
        "ucg-type": "None"
      }
      ...
```

SYSTEM AND METHODS FOR UNIFIED COLLECTION OF NETWORK INFORMATION

BACKGROUND

Modern telecommunications networks offer a number of different communications services, such as television services, data services, and telephone services provided over both wired and wireless platforms. Multiple developing and legacy systems support and enable these communication services. As technologies continue to develop, there is an increasing demand for networks to support, for example, network automation, learning, and improvements.

BRIEF DESCRIPTION OF THE DRAWINGS

FIGS. 7A-7C are examples of messages used in the unified collection service platform of FIG. 6.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Network service providers rely on increasing amounts and varieties of data to manage their networks. Network performance data, alarm data, alert data, event data, log data, live data, hardware data, and many other types of data may be collected throughout a heterogeneous network environment. Many of the data messages generated throughout a network environment have different vendor-specific message formats. These different message formats necessitate different data collection systems across the network, require duplicative data collection functions, and limit standardization. Furthermore, when network service providers seek to change or upgrade network equipment, integration of systems that use vendor-specific message formats can significantly increase integration and on-boarding time and effort.

Systems and methods described herein provide a unified collection service that enables collection, transformation, and/or translation of network data, such as real-time alarm and key performance indicator (KPI) data, across multiple types of vendor equipment that may use multiple different protocols. The systems and methods include pluggable components (or "collection pods") that are independent from each other and that allow different types of data messages to be added into a single message stream that can be converted into a common (e.g., service provider universal) message format. The collection pods connect to the vendor equipment and can be deployed to accept messages with vendor-specific custom code or information across different network domains. The collection pods may encapsulate the vendor messages and forward them to a central messaging layer for transformation/translation into a common message format and publication to different network systems.

Collection pods may be scaled or torn down as network technology, vendor protocols, and/or equipment change. In contrast, the central messaging layer may remain stable, only being modified in scale to grow with increasing workloads or shrink for optimization. Thus, the unified collection service may simplify integration of legacy network equipment and enable installation of new network equipment with reduced on-boarding times. In one example, data from the unified collection service may be used to support a self-organizing network (SON) or network components to manage a network and/or facilitate corrective action in response to, or detection of, service anomalies. In one example, data from the unified collection service may be used to support future monitoring needs for next generation networks including real-time dynamic network slice management.

Figure 1:
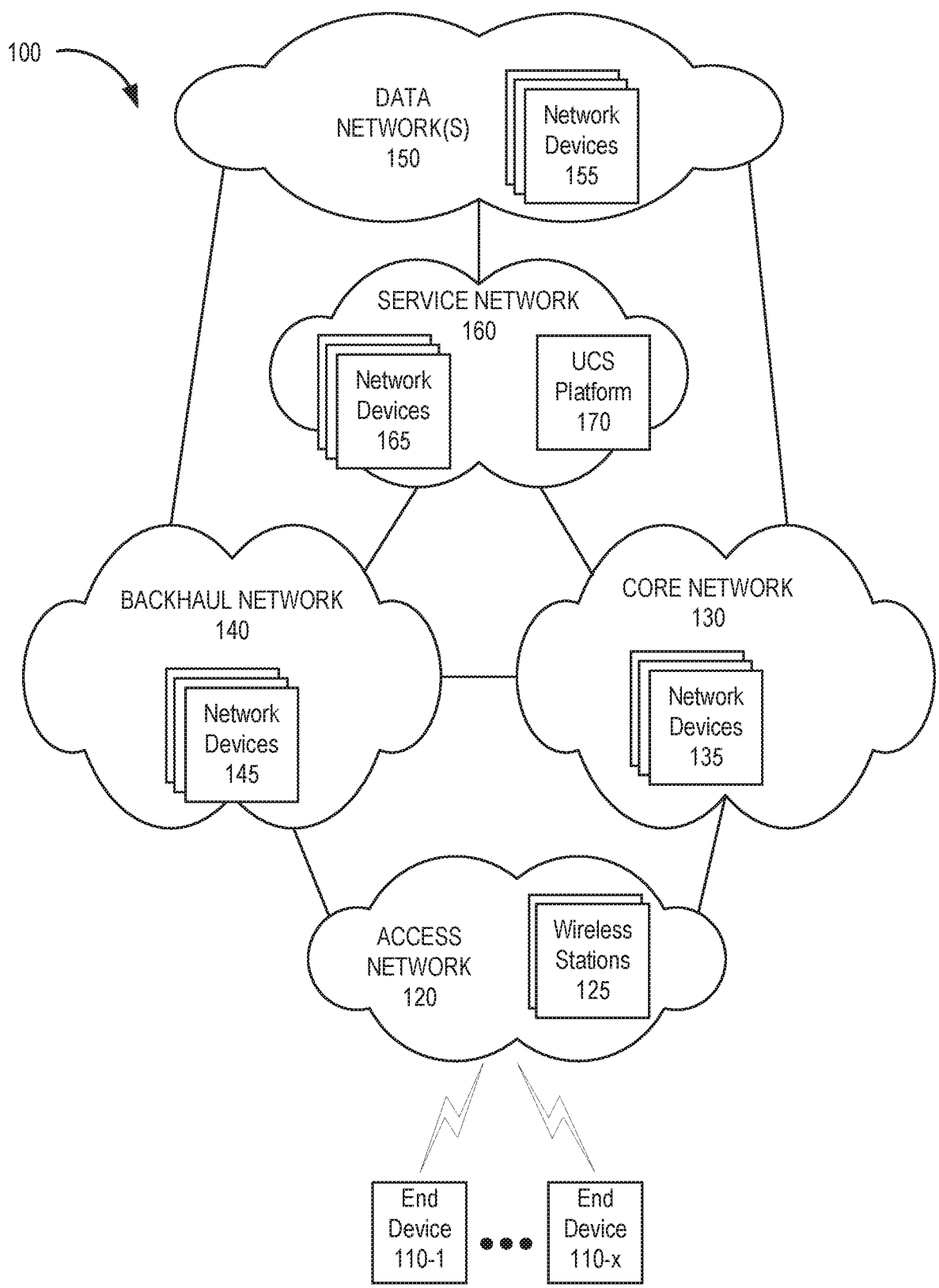
FIG. 1 is a diagram illustrating an exemplary environment in which an embodiment of a unified collection service may be implemented.

FIG. 1 is a diagram of an exemplary environment 100 in which the systems and/or methods, described herein, may be implemented. As shown in FIG. 1, environment 100 may include end devices 110-1 to 110-X (referred to herein collectively as "end devices 110" and individually as "end device 110"), an access network 120, a core network 130, a backhaul network 140, a data network 150, and a service network 160. According to an implementation, access network 120, core network 130, backhaul network 140, and service network 160 may be referred to as a "traffic network," which may be owned/operated by the same service provider. According to another implementation, one or more data networks 150 may also be included in the traffic network.

End device 110 includes a device that has computational and communication capabilities. End device 110 may be implemented as a mobile device, a portable device, or a stationary device. By way of further example, end device 110 may be implemented as a smartphone, a personal digital assistant, a tablet, a wearable device, a set top box, an infotainment system in a vehicle, a smart television, a game system, a music playing system, or some other type of user device. End device 110 may be implemented as a Machine Type Communication (MTC) device, an Internet of Things (IoT) device, an enhanced MTC device (eMTC) (also known as Cat-M1), a machine-to-machine (M2M) device, a user device, or some other type of end node. According to various exemplary embodiments, end device 110 may be configured to execute various types of software (e.g., applications, programs, etc.). The number and the types of software may vary from one end device 110 to another end device 110.

Access network 120 includes one or multiple networks of one or multiple types. For example, access network 120 may be implemented to include a terrestrial network. According to an exemplary implementation, access network 120 includes a radio access network (RAN). For example, the RAN may be a Third Generation (3G) RAN, a Fourth Generation (4G) RAN, a Fifth Generation (5G) RAN, or a future generation RAN. By way of further example, access network 120 may include an Evolved UMTS Terrestrial Radio Access Network (E-UTRAN) of a Long Term Evolution (LTE) network or an LTE-Advanced (LTE-A) network. Access network 120 may also include other types of networks, such as a WiFi network, a local area network (LAN), a personal area network (PAN), or other type of network that provides access to or can be used as an on-ramp or interface to core network 130 or backhaul network 140. Depending on the implementation, access network 120 may include various types of network devices and wireless stations 125. For example, wireless station 125 of access network 120 may include a base station (BS), a base transceiver station (BTS), a Node B, an evolved Node B (eNB), a next generation Node B (gNB), a remote radio head (RRH), an RRH and a baseband unit (BBU), a BBU, and/or other type of node (e.g., wireless, wired, optical) that includes network communication capabilities.

Core network 130 may manage communication sessions for end devices 110. For example, core network 130 may establish an Internet Protocol (IP) connection between end device 110 and a particular data network 150. Furthermore, core network 130 may enable end device 110 to communicate with an application server, and/or another type of device, located in a particular data network 150 using a communication method that does not require the establishment of an IP connection between end device 110 and data network 150, such as, for example, Data over Non-Access Stratum (DoNAS). Depending on the implementation, core network 130 may include various network devices 135, such as a gateway, a support node, a serving node, a mobility management entity (MME), Access and Mobility Function (AMF), as well other network devices pertaining to various network-related functions, such as billing, security, authentication and authorization, network polices, subscriber profiles, and/or other network devices that facilitate the operation of core network 130.

Backhaul network 140 includes one or multiple networks of one or multiple types and technologies. According to an exemplary implementation, backhaul network 140 includes a backbone network. For example, the backbone network may be implemented as an optical transport network, an ultra-high capacity wireless backhaul network, an Ethernet backhaul network, a dark fiber network, or another suitable architecture (e.g., Internet Protocol (IP)/Multiprotocol Label Switching (MPLS), millimeter wave technology, etc.). Depending on the implementation, backhaul network 140 may include switches, routers, repeaters, various types of optical network elements (e.g., multiplexers, de-multiplexers, switches, transmitters, receivers, etc.), and/or other types of network devices. For purposes of illustration and description, network devices 145 may include the various types of network devices that may be resident in backhaul network 140, as described herein. Backhaul network 140 may also include a fronthaul network.

Data network 150 may include a packet data network. A particular data network 150 may include, and/or be connected to and enable communication with, a local area network (LAN), a wide area network (WAN), a metropolitan area network (MAN), an optical network, a cable television network, a satellite network, a wireless network (e.g., a code division multiple access network, a general packet radio service (GPRS) network, and/or an LTE network), an ad hoc network, a telephone network (e.g., the Public Switched Telephone Network (PSTN) or a cellular network), an intranet, or a combination of networks. Some or all of a particular data network 150 may be managed by a communication services provider that also manages backhaul network 140, core network 130, radio access network 120, and/or particular end devices 110. For example, in some implementations, a particular data network 150 may include an IP Multimedia Sub-system (IMS) network (not shown in FIG. 1). An IMS network may include a network for delivering IP multimedia services and may provide media flows between two different end devices 110, and/or between a particular end device 110 and external IP networks or external circuit-switched networks (not shown in FIG. 1). Data network 150 may include various types of network devices 155, which may implement different network functions described further herein.

Service network 160 may include one or multiple networks of one or multiple types. For example, service network 160 may include a cloud network, a WAN, a MAN, a service provider network, a private IP network, some other type of backend network, and so forth. As illustrated, according to an exemplary embodiment, service network 160 includes network devices 165 and a unified collection service (UCS) platform 170.

Service network 160 may include various types of network devices 165, which may implement different network functions described further herein. For example, network devices 165 may provide various physical resources (e.g., processors, memory, storage, communication interface, etc.), software resources (e.g., operating system, etc.) and virtualization elements (e.g., hypervisor, container engine, etc.). According to other exemplary embodiments, UCS platform 170 or portions thereof may be combined in a single device or a distributed environment. In another implementation, service network 160 may be included as part of another network, such core network 130, backhaul network 140, or data network 150.

UCS platform 170 may include network devices for facilitating a network agnostic collection of fault data, performance data, and other data from devices across the multiple networks in the traffic network of network environment 100 (e.g., devices in access network 120, core network 130, backhaul network 140, data network 150, and/or service network 160). As described further herein, UCS platform 170 may include multiple micro-service clusters (or collection pods) configured for collection of specific vendor equipment. Each micro-service cluster may feed into highly-scalable stream processing system of UCS platform 170 to ingest collected data. The stream processing system may include a message transformer implemented, for example, at a central messaging or processing layer. The central messaging layer may include, for example, a collection of network devices located in different geographic regions.

UCS platform 170 and/or other network devices described herein may refer to a dedicated hardware component implementing a network function instance or to a hardware component that is part of a common shared physical infrastructure used to implement virtualized network function instances using software defined networking (SDN) or another type of virtualization technique. Thus, UCS platform 170 may be configured to implement a particular network function instance as a Virtual Network Function (VNF) (e.g., in a virtual machine), as a Cloud-native Network Function (CNF) (e.g., in a container), as a serverless architecture event handler, and/or using a different type of virtualization. The common shared physical infrastructure may be implemented using one or more computer devices in a cloud computing center, a multi-access edge computing (MEC) system associated with a wireless station, and/or in another type of computer system.

The number and arrangement of devices in environment 100 are exemplary. According to other embodiments, environment 100 may include additional devices and/or differently arranged devices, than those illustrated in FIG. 1. The number and arrangement of networks in environment 100 are exemplary. According to other embodiments, environment 100 may include additional networks, fewer networks, and/or differently arranged networks than those illustrated in FIG. 1.

A network device, as described herein, may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, and/or a cloud device).

Environment 100 includes links between the networks and between the devices. Environment 100 may be implemented to include wired, optical, and/or wireless links among the devices and the networks illustrated. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary.

Figure 2:
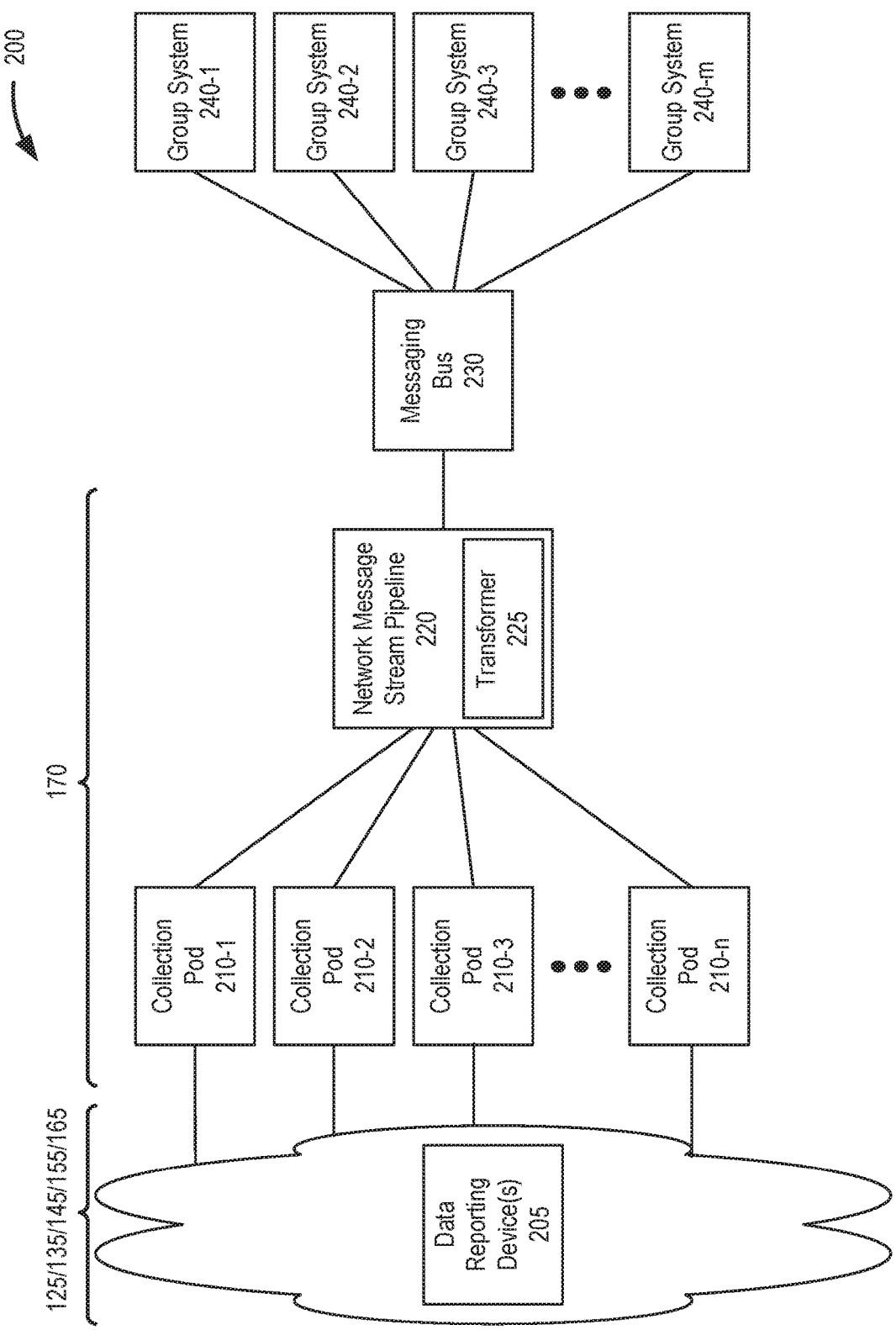
FIG. 2 is a diagram illustrating an exemplary configuration that may provide an embodiment of the unified collection service.

FIG. 2 is a diagram illustrating an exemplary implementation of a UCS 170 configuration in which UCS 170 may be communicatively coupled to data reporting devices. As shown in FIG. 2, an environment 200, which is consistent with the traffic network of network environment 100, may include data reporting devices 205, multiple collection pods 210-1 through 210-n (referred to herein collectively as "collection pods 210" and generically as "collection pod 210"), a network message stream pipeline 220, a messaging bus 230, and multiple group systems 240-1 through 240-m (referred to herein collectively as "group systems 240" and generically as "group system 240"). Collection pods 210 and network message stream pipeline 220 may be implemented in UCS platform 170.

Data reporting devices 205 may include a computing device or network device that generates fault data, performance data, or other types of network data to support network analytics and/or real-time network management. Data reporting devices 205 may correspond, for example, to network devices 125/135/145. In other implementations, data reporting devices 205 may additionally correspond to network devices 155 and/or 165. Data reporting devices 205 may include equipment from multiple different vendors providing different functions and using different protocols. Data generated by data reporting devices 205 may include, for example, network traffic data, fault data, and/or performance data. The reported data may include multiple key performance indicators (KPIs). KPIs may relate to any metric deemed important by a service provider, network operator, end user, etc., such as, for example, interconnection performance indicators (e.g., abnormal call release, average setup time, answer seizure ratio (ASR), etc.), service level agreement (SLA) management, application performance, or other network performance metrics. Data reporting devices 205 may be configured to provide data to a collection pod 210.

Each collection pod 210 may include vendor/technology specific "micro service" clusters built to suit a specific type of data collection (e.g., applicable to a certain data reporting device 205 or group of data reporting devices 205). According to different implementations, collection pod 210 may be located at a network edge, near a particular data reporting device 205, or in the cloud. For example, multiple servers or proxy nodes running in cloud or edge compute clusters/farms may be used to implement collection pods 210. Collection pods 210 may be implemented as containers, virtual machines, or another type of virtualization architecture that provides one or multiple data collection services for data reporting devices 205. Collection pods 210 may be configured to function with minimal processing delay. Collection pods 210 may obtain the exact vendor/technology message, provide pre-processing (e.g., simple filtering and a minimal envelope for the vendor/technology message to identify when and where the vendor/technology message was obtained and the type of message), and publish the pre-processed vendor/technology message into network message stream pipeline 220.

Network message stream pipeline 220 may include one or more network devices or computing devices that receives pre-processed vendor/technology message from collection pods 210. Network message stream pipeline 220 may apply highly-scalable stream processing platforms to ingest data from collection pods 210. According to an implementation, network message stream pipeline 220 may include a centralized or regional transformer 225 to convert vendor-specific messages into a unified message format. As described further herein, transformer 225 may store, for example, mapping files for each type of data reporting device 205. The mapping files may map vendor-specific data formats to one or more vendor-agnostic models that support a unified message format for the traffic network of network environment 100. Generally, compared to collection pods 210, network message stream pipeline 220 may provide more advanced filtering, additional augmentation (e.g., examining/extracting data from the message) and routing. According to an implementation, the amount of processing and features provided by network message stream pipeline 220 may be adjusted as a tradeoff for speed.

Messaging bus 230 may receive and distribute messages throughout the traffic network of network environment 100. For example, network message stream pipeline 220 may publish messages with the unified message format to messaging bus 230 for distribution to one or more group systems 240.

Group system 240 may include a one or more network devices or computing devices associated with a department or group for an enterprise. According to an implementation, group systems 240 may be part of an operations support system (OSS) for one or more of access network 120, core network 130, or backhaul network 140. According to another implementation, group system 240 may include a network provisioning system, a fault management system, a billing system, etc.

Figure 3:
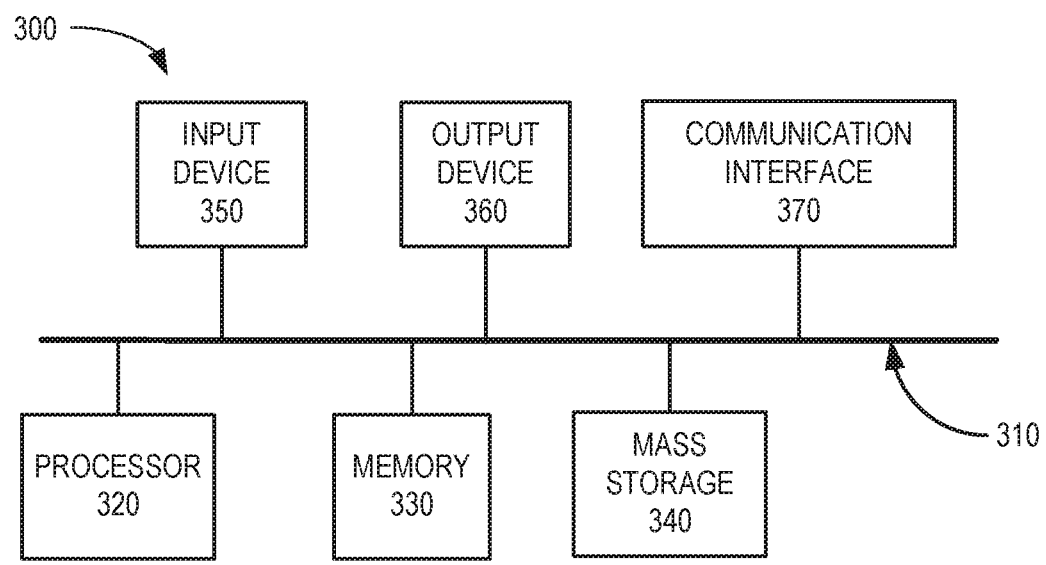
FIG. 3 is a block diagram depicting exemplary components of a device that may correspond to one of the devices in FIGS. 1 and 2.

FIG. 3 is a block diagram depicting exemplary components of a device 300 that may correspond to end device 110, one of network devices 125/135/145/155/165, collection pod 210, transformer 225, messaging bus 230, or group system 240. End device 110, network devices 125/135/145/155/165, collection pod 210, transformer 225, messaging bus 230, or group system 240 may include one or more devices 300. Device 300 may include a bus 310, a processor 320, a memory 330, mass storage 340, an input device 350, an output device 360, and a communication interface 370.

Bus 310 includes a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic. For example, the processor 320 may be an x86 based CPU, and may use any operating system, which may include varieties of the Windows, UNIX, and/or Linux. The processor 320 may also use high-level analysis software packages and/or custom software written in any programming and/or scripting languages for interacting with other network entities and providing applications to, for example, a plurality of data reporting device 205 which are communicatively coupled to service network160.

Memory 330 may include any type of dynamic storage device that may store information and/or instructions, for execution by processor 320, and/or any type of non-volatile storage device that may store information for use by processor 320. For example, memory 330 may include a RAM or another type of dynamic storage device, a ROM device or another type of static storage device, and/or a removable form of memory, such as a flash memory. Mass storage device 340 may include any type of on-board device suitable for storing large amounts of data, and may include one or more hard drives, solid state drives, and/or various types of redundant array of independent disks (RAID) arrays. Mass storage device 340 may be suitable for storing files associated with UCS platform 170 for distributing uniform format message to, for example, messaging bus 230.

Input device 350, which may be optional, can allow an operator to input information into device 300, if required. Input device 350 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 350. Output device 360 may output information to an operator of device 300. Output device 360 may include a display (such as an LCD), a printer, a speaker, and/or another type of output device. In some embodiments, device 300 may be managed remotely and may not include output device 360.

Communication interface 370 may include a transceiver that enables device 300 to communicate over communication links with other devices and/or systems. Communications interface 370 may be a wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 370 may include a transmitter that converts baseband signals to RF signals and/or a receiver that converts RF signals to baseband signals. Communication interface 370 may be coupled to one or more antennas for transmitting and receiving RF signals. Communication interface 370 may include a logical component that includes input and/or output ports, input and/or output systems, and/or other input and output components that facilitate the transmission/reception of data to/from other devices. For example, communication interface 370 may include a network interface card (e.g., Ethernet card) for wired communications and/or a wireless network interface (e.g., a Wi-Fi) card for wireless communications. Communication interface 370 may also include a USB port for communications over a cable, a Bluetooth wireless interface, a radio-frequency identification (RFID) interface, a near-field communication (NFC) wireless interface, and/or any other type of interface that converts data from one form to another form.

As described below, device 300 may perform certain operations relating to the unified collection service. Device 300 may perform these operations in response to processor 320 executing software instructions contained in a computer-readable medium, such as memory 330 and/or mass storage 340. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently-arranged components than depicted in FIG. 3.

Figure 4:
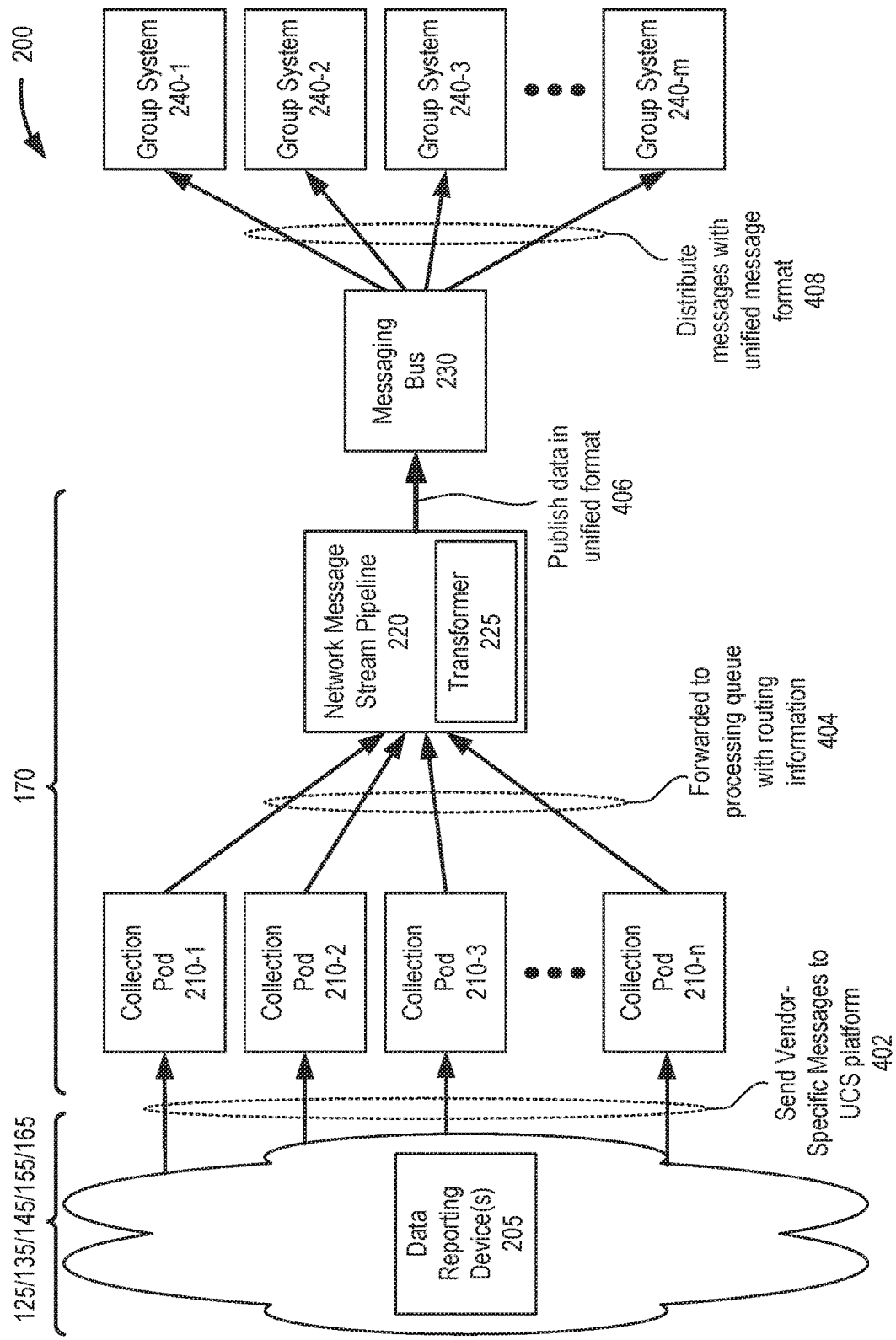
FIG. 4 is a diagrams illustrating communications in an exemplary process of the unified collection service.

FIG. 4 is a diagram illustrating exemplary communication for the unified collection service in environment 200. As shown in FIG. 4, data reporting devices 205 may provide device and/or vendor specific messages 402. The vendor-specific messages 402 may include, for example, information (e.g., alarm data, fault data, performance data, log data, etc.) using formats and/or protocols that are specific to a particular device, technology, and/or vendor. For example, data reporting devices 205 may use proprietary protocols, standardized protocols, or unique variants of open source protocols to a provide vendor specific message 402, such as variants of open source remote procedure calls (e.g., gRPC), Representational State Transfer (REST) application programming interfaces (APIs), IPv6-formatted transmissions, legacy Simple Network Management Protocol (SNMP), Network Configuration Protocol (NETCONF)/YANG (e.g., described in Internet Engineering Task Force RFC 6241 and RFC 6020), Internet Protocol Detail Record (IPDR) protocol, Transaction Language 1 (TL1) signals, Simple Object Access Protocol (SOAP) commands, etc.

Each vendor specific message 402 may be directed to one of collection pods 210. Each collection pod 210 may include vendor/technology specific micro-service clusters built to suit the specific need/format for vendor specific messages 402. Each collection pod 210 may be, for example, a pluggable component executed as a virtualized network function. According to an implementation, collection pods 210 may be located in (or communicatively coupled to) edge devices, near corresponding data reporting devices 205, or in a cloud-based network (e.g., service network 160) to minimize signal latency between a collection pod 210 and a corresponding data reporting device 205. As technologies implemented in network environment 100 change, data reporting devices 205 may be changed, added or removed. Accordingly, with decreasing needs of older technologies, the amount and type of collection pods 210 can be scaled or torn down, with the underlying cloud orchestration and resources (e.g., of service network 160) used for the new technologies and/or data reporting devices 205 (e.g., that may provide different vendor specific messages 402).

Collection pods 210 may receive vendor specific messages 402 from data reporting devices 205, provide simple filtering, and add message routing data to each of the vendor specific messages 402. The message routing data may, for example, identify a network address (e.g., a uniform resource locator (URL)) to which the data in vendor specific messages 402 should be eventually directed. According to an implementation, each collection pod 210 may provide different routing information for different types of information generated by data reporting devices 205. For example, alarm data from one or more data reporting devices 205 may be directed to group system 240-1, while log data from the same or different data reporting devices 205 may be directed to a different group system 240-2.

Collection pods 210 may forward each of the vendor specific messages with routing data to network message stream pipeline 220, as indicated by reference 404. Network message stream pipeline 220 may receive each forwarded message and convert the vendor-specific data into a common format (referred to herein a "unified message format") for use by devices in one or more of access network 120, core network 130, backhaul network 140, data network 150, or service network 160. For example, the unified message format may be a vendor-agnostic format that can be understood universally within the traffic network of network environment 100. Network message stream pipeline 220 may add a layer (e.g., message header) of business logic, more advanced filtering, additional augmentation (e.g., examining/extracting data from the message), and routing information. According to an implementation described further herein, network message stream pipeline 220 (e.g., transformer 225) may convert vendor-specific data into YANG ("Yet Another Next Generation") data modeling language for the unified message format.

Still referring to FIG. 4, network message stream pipeline 220 may forward unified format messages to a messaging bus 230, as indicated by reference 406. Based on addressing information from collection pods 210 and/or network message stream pipeline 220, messaging bus 230 may distribute the messages throughout the traffic network of network environment 100. For example, as indicated by reference 408, messaging bus 230 may forward messages with the unified message format to the appropriate group system(s) 240, which may be included in any of access network 120, core network 130, backhaul network 140, data network 150, or service network 160.

Figure 5:
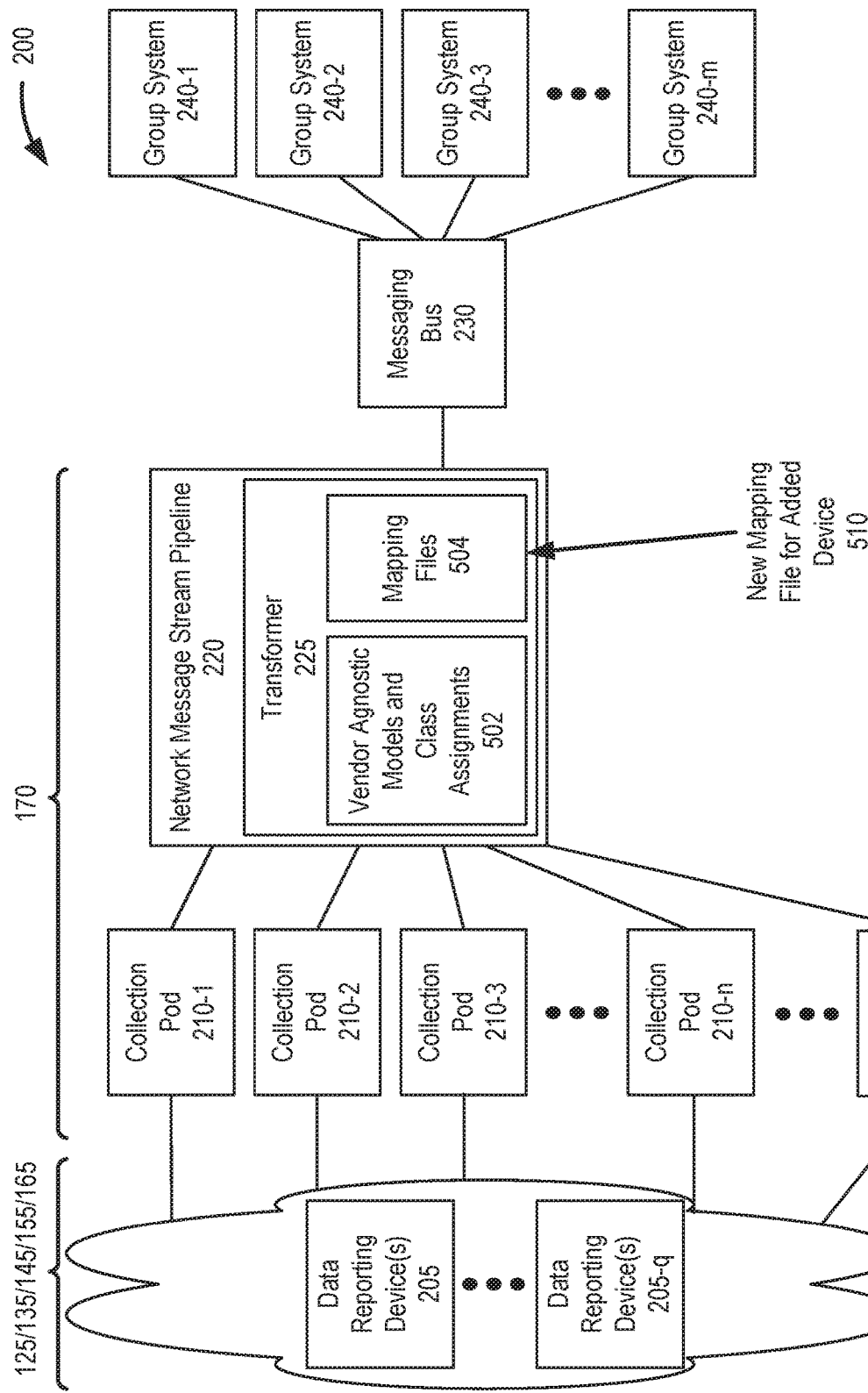
FIG. 5 is a diagram showing an exemplary modular addition process for the unified collection service.

FIG. 5 is a diagram showing a modular addition process for the unified collection service in environment 200. As shown in FIG. 5, transformer 225 may include vendor agnostic models and class assignments 502 and mapping files 504.

Vendor agnostic models and class assignments 502 may include, for example, data reporting models for different types of data that may be reported by reporting devices 205. Data types may include Next-Generation Passive Optical Network (NGPON) data, customer premise equipment (CPE) data, mobile service engine (MSE) data, service experience data, level 2 (L2) alarm data, level 3 (L3) alarm data, performance data, and/or other types of data that may be used for maintenance and management in the traffic network of network environment 100. A vendor agnostic model may be assigned to one or more classes that may be used for classifying and forwarding incoming data.

Mapping files 504 may be used by transformer 225 to convert incoming data from data reporting devices 205 (e.g., vendor specific messages 402 and/or 404) into a unified format that can be understood and distributed throughout the traffic network of network environment 100. According to one implementation, each mapping file 504 may match a vendor specific message to a vendor agnostic model and/or class from vendor agnostic models and class assignments 502. Mapping files 504 may be created for each device type of data reporting devices 205. For example, mapping files 504 may be manually created by network administrators when a new type of device is introduced into the traffic network. Mapping files 504 may cross-reference terminology, format, order, units of measurement, etc., from a vendor-provided format to the uniform format.

As further shown in FIG. 5, assume a new type of data reporting device 205-q may be added to the traffic network of network environment 100 (e.g., a new devices in access network 120, core network 130, backhaul network 140, data network 150, or service network 160). UCS 170 may be modified to accept data from the new type of data reporting device 205-q. For example, a new collection pod 210-p may be configured, if necessary, at a network edge to receive data (e.g., vendor specific messages 402) from data reporting device 205-q. For example, a virtual network function for a micro-service performing a collection pod function may be instantiated for the new type of data reporting device 205-p in service network 160. Furthermore, a new mapping file may be added to mapping files 504, as shown at reference 510, to support the new type of data reporting device 205-p. The new mapping file may map vendor-specific data formats to one or more vendor agnostic models and class assignments 502.

As shown in FIG. 5, new types of data reporting devices 205 can be added to network environment 100 without changes to either data reporting devices 205 or network group systems 240. As technology changes, scales or decommissions, collection pods 210 can be scaled down or torn down quickly with little network impact, while the underlying cloud orchestration and compute resources may be used immediately for new technologies and/or data reporting. Thus, the uniform collection service described herein eliminates vendor lock-in, where network service providers are tied to a particular vendor, vendor technology, and/or vendor release schedules.

Figure 6:
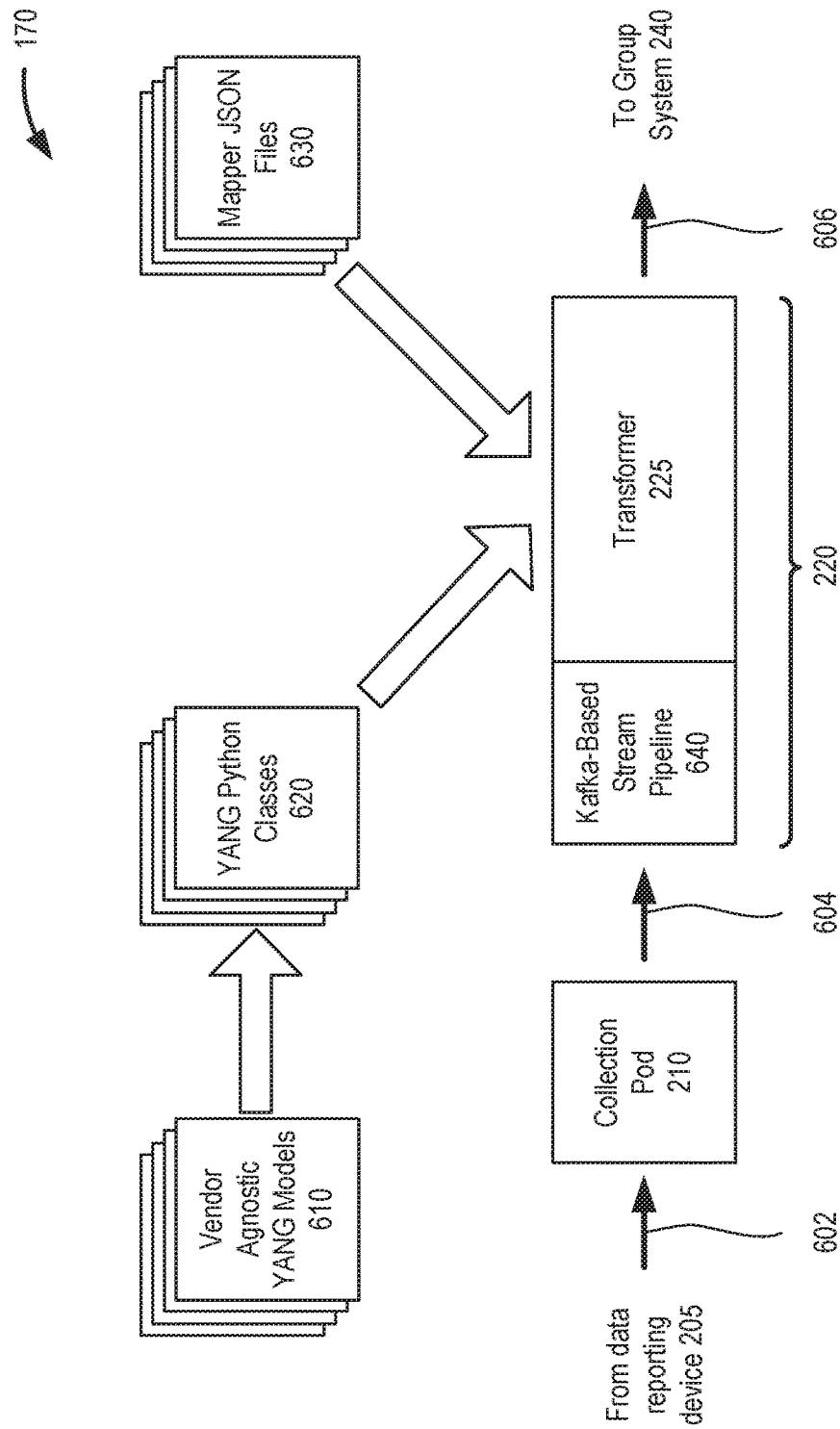
FIG. 6 is a diagram illustrating an exemplary embodiment of a unified collection service platform.

FIG. 6 is a diagram illustrating an exemplary implementation of UCS platform 170 using YANG-based unified collection. While a YANG-based model is described herein as one embodiment for unified data collection, in other implementations, UCS platform 170 may be based on different data modeling languages, programming languages (such as C++, Java, Perl, etc.), and/or data streaming platforms. As shown in FIG. 6, vendor agnostic YANG models 610 are associated with YANG Python classes 620 and fed to transformer 225. Vendor agnostic YANG models 610 and YANG Python class 620 may correspond to, for example, vendor agnostic models and class assignments 502 of FIG. 5. Vendor agnostic YANG models 610 may be generated for different types of message data (e.g., level 2 alarm data models, level 3 alarm data models, various KPI models, etc.). Vendor agnostic YANG models 610 may provide standard data formats that are used throughout network environment 200, such as by group systems 240. Each of vendor agnostic YANG models 610 may be associated with, or bound to, a YANG Python class 620. For each vendor agnostic YANG model 610, a one-time compiling activity may be used to bind the YANG model 610 to a class 620.

Mapper Java Script Object Notation (JSON) files 630 may be manually created for each type of device (e.g., each type of data reporting device 205) and fed to (and stored in a memory of) transformer 225. Mapper JSON files 630 may correspond to, for example, mapping files 504 of FIG. 5. Mapper JSON files 630 may be used to normalize and produce universal data model YANG mapped JSON files.

Once configured with vendor agnostic YANG models 610 bound to YANG Python classes 620 and mapper JSON files 630, one of collection pods 210 of UCS platform 170 may receive a vendor-specific message 602 from data reporting devices 205. FIG. 7A provides an example of vendor-specific message 602. In the example of in FIG. 7A, vendor-specific message 602 includes a vendor-specific message for an alarm indication.

Collection pods 210 may add message routing data to vendor-specific message 602 to create an encapsulated message 604. Encapsulated message 604 may include routing information for vendor-specific message 602. FIG. 7B provides an example of encapsulated message 604. In the example of FIG. 7B, encapsulated message 604 adds a universal source type (i.e., "XYZDATA"), a source device name (i.e., "XXXXXXXXX-01010101B"), universal data type (e.g., "LIVE"), and a universal topic locator (i.e., "persistent://enmv/xyz-alarms/ECLIPSE-XYZ-from-CLD-ALARM-2-sec-3057"). Collection pod 210 may publish encapsulated message 604 to a stream processing pipeline of network message stream pipeline 220, such as a Kafka-based stream pipeline 640.

Kafka-based stream pipeline 640 may receive encapsulated message 604 and add encapsulated message 604 to a real-time data pipeline (or queue) with other incoming messages from collection pods 210. Transformer 225 may process encapsulated message 604 to transform encapsulated message 604 into a unified language for use network environment 200. In the example, of FIG. 6, transformer 225 may transform encapsulated message 604 into YANG data modeling language to create a unified format message 606. For example, transformer 225 may apply a corresponding mapper JSON file 630 to encapsulated message 604 to generate unified format message 606 that is based on one of vendor agnostic YANG models 610. Transformer 225 may match and/or convert fields in encapsulated message 604 to fit the particular vendor agnostic YANG model 610.

Unified format message 606 may include fields and formats that can be read, for example, by any of group systems 240. FIG. 7C provides an example of unified format message 606. In the example of FIG. 7C, some fields may not contain data for certain types of encapsulated messages 604. For example, a "system" field or a "state" field may not be relevant for encapsulated message 604. In other examples, additional fields for server types, authentication, authorization, accounting, memory state, and other types of data (not shown in FIG. 7C) may be included as placeholders in unified format message 606. As further shown in FIG. 7C, an "alarms" field may transform raw alarm data from encapsulated message 604 into a uniform YANG format, along with the raw alarm data. Once transformed into the unified message format 600, network message stream pipeline 220 may forward unified format message 606 to messaging bus 230 for distribution.

FIG. 6 described certain communications, and FIGS. 7A-7C provide illustrations of a message conversion from a vendor-specific format to a unified message format, for use in network environment 200. In other implementations, vendor-specific message 602, encapsulated message 604, and unified format message 606 may include fewer, additional, different, or differently-arranged fields that illustrated in FIGS. 7A-7C.

Figure 8:
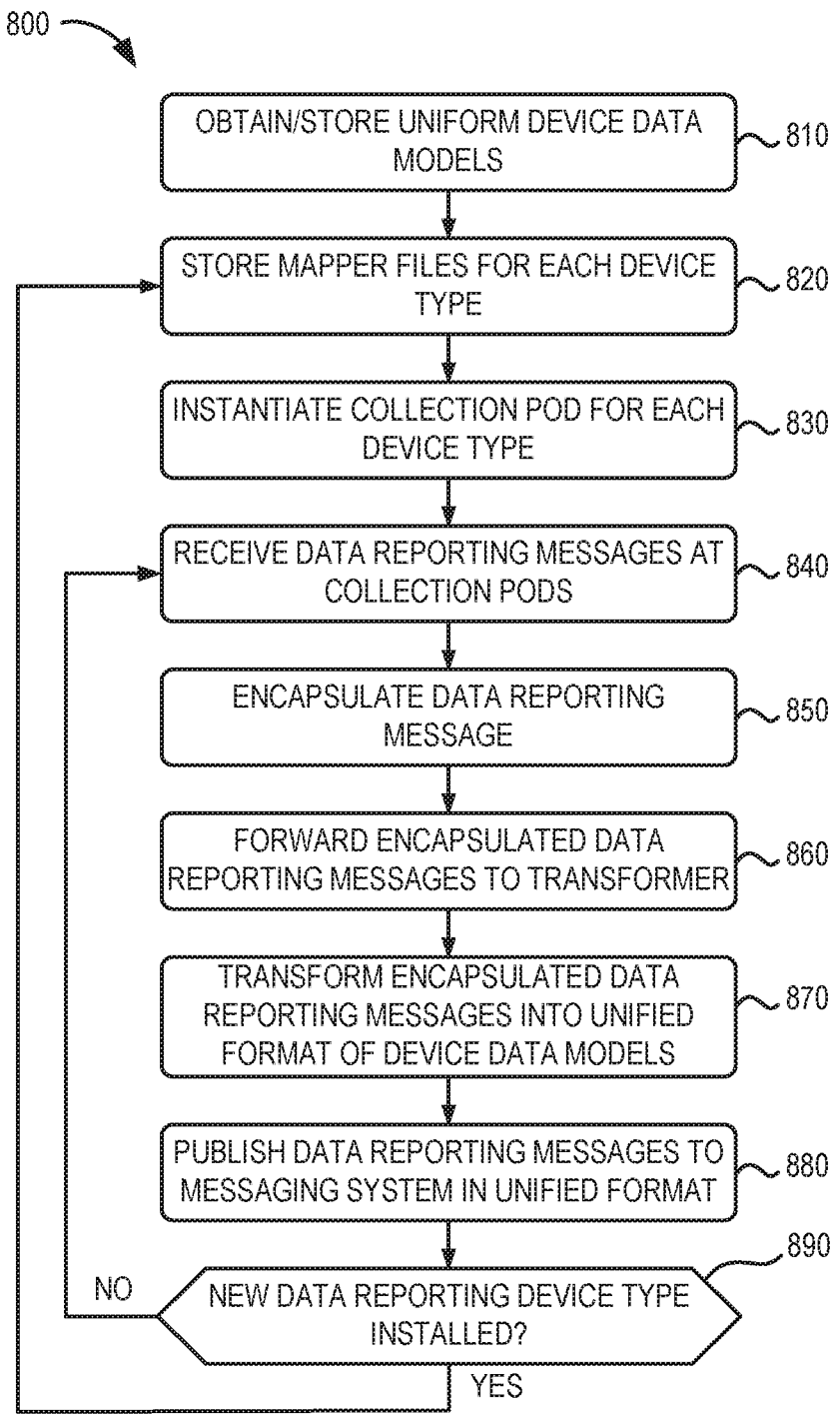
FIG. 8 is a flow diagram illustrating an exemplary process of the unified collection service, according to an implementation described herein.

FIG. 8 is a flow diagram illustrating an exemplary process 800 of the unified collection service described herein. According to an implementation, UCS platform 170 may performs steps of process 800. For example, processor 320 may execute software stored in memory 330 to perform the process blocks illustrated in FIG. 8 and described herein.

Referring to FIG. 8, process 800 may include configuring uniform device data models for network data types (block 810), storing mapper files for each device type (block 820), and instantiating a collection pod for each device type (block 830). For example, as described in connection with FIG. 5, vendor agnostic models and class assignments 502 may include, for example, data reporting models for different types of data that may be reported by reporting devices 205. Mapping files 504 may be created for each device type of data reporting devices 205. Mapping files 504 may be stored and later used by transformer 225 to convert incoming vendor specific messages 402 from data reporting devices 205 into a unified format that can be understood and distributed throughout network environment 200. Each mapping file 504 may match a type of vendor specific message to a vendor agnostic model and/or class from vendor agnostic models and class assignments 502. Data reporting devices 205 may be configured to provide data to a collection pod 210. Each collection pod 210 may include vendor/technology specific "micro service" clusters configured to receive a specific type of data collection and/or data reporting device 205

Process 800 may further include receiving data reporting messages at the collection pods (block 840), encapsulating the data reporting messages (block 850), and forwarding the encapsulated data reporting messages to a transformer (block 860). For example, vendor specific messages 402 may be directed to respective collection pods 210. Each collection pod 210 may receive vendor specific messages 402, add a header with routing data to the messages, and forward each of the vendor specific messages with routing data to network message stream pipeline 220 that includes transformer 225.

Process 800 may also include transforming the encapsulated data reporting message into a unified format of the device data model (block 870), and publishing the data reporting message to a messaging system in the unified format (block 880). For example, transformer 225 in network message stream pipeline 220 may receive forwarded messages from collection pods 210 and convert the vendor-specific data into a unified message format suitable for use by, for example, group systems 240. Network message stream pipeline 220 may forward the unified format messages to messaging bus 230, which may distribute the messages throughout network environment 100.

If no new data reporting device types are installed in the network (block 890—No), process 800 may return to block 840 to continue receiving incoming data reporting messages. If a new data reporting device type is installed in the network (block 890—Yes), process 800 may return to block 820 to store a new mapper file for the new device type.

Although FIG. 8 illustrates an exemplary process 800 of the service, according to other embodiments, process 800 may include additional operations, fewer operations, and/or different operations than those illustrated in FIG. 8, and described herein. For example, in another implementation, collection pods 210 may perform some processing or pre-processing tasks that would otherwise be performed by transformer 225.

Systems and methods described herein enable collection of network data, such as alarm and KPI data, across multiple types of vendor equipment that use multiple protocols. A scalable, cloud-based architecture provides for message collection in vendor-specific formats, normalization into a unified message format, and publication to network support systems. The systems and methods permit simple integration and scaling for new types of vendor equipment, which may reduce vendor lock-in and improve on-boarding times for incorporating new metrics. Technology-specific data collection may be isolated at the collection pods, allowing for simple addition or removal of the different collection functions.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. thus, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 320, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 320) of a device. A non-transitory storage medium includes one or more of the storage mediums described in relation to memory 330.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
receiving, by a first network device in a network, a data reporting message from a data reporting device, wherein the data reporting message includes a vendor-specific format for a particular data reporting device, and wherein the first network device is configured to provide a data collection micro-service for the vendor-specific format;
adding to the data reporting message, by the first network device, routing data of a destination for the data reporting message, wherein the adding creates an encapsulated data reporting message;
forwarding, by the first network device, the encapsulated data reporting message to a second network device;
transforming, by the second network device, the encapsulated data reporting message into a second format that includes a unified message format, wherein the transforming creates a unified data reporting message;
forwarding, by the second network device, the unified data reporting message toward the destination based on the routing data;
storing, by the second network device, a new mapping file for a new data reporting device that has been added to the network, wherein the new data reporting device generates a new type of data reporting message including a third format for the new data reporting device;
instantiating, by the first network device, a micro-service to receive the new type of data reporting message; and
receiving, by the first network device, another data reporting message from the new data reporting device, the other data reporting message including the third format for the new data reporting device.

2. The method of claim 1, wherein the unified data reporting message supports real-time network management.

3. The method of claim 1, wherein the first network device is communicatively coupled to the data reporting device to minimize signal latency between the first network device and the data reporting device.

4. The method of claim 1, further comprising:
receiving, by a third network device in the network, another data reporting message from another data reporting device, the other data reporting message including a third format for another particular data reporting device;
adding to the other data reporting message, by the third network device, routing data based on the type of data in the other data reporting message, wherein the adding creates another encapsulated data reporting message;
forwarding, by the third network device, the other encapsulated data reporting message to the second network device; and
transforming, by the second network device, the other encapsulated data reporting message into the second format that includes the unified message format, wherein the transforming creates another unified data reporting message.

5. The method of claim 1, wherein the transforming further comprises:
storing a unified device data model and a mapping file for the data reporting device, wherein the unified device data model includes a format for data in the data reporting message, and wherein the mapping file includes instructions to map the data in the data reporting message to the unified message format; and
applying the mapping file to the data reporting message.

6. The method of claim 1, wherein forwarding the unified data reporting message further comprises:
publishing the unified data reporting message to a messaging bus for the network.

7. The method of claim 1, further comprising:
adding to the other data reporting message, by the first network device, routing data for the other data reporting message, wherein the adding creates another encapsulated data reporting message; and
forwarding, by the first network device, the other encapsulated data reporting message to the second network device.

8. The method of claim 1, wherein the second network device is located in a central processing layer that includes a collection of second network devices located in different geographic regions.

9. A system comprising:
a first network device in a network, the first network device comprising a first communication interface and being configured to:
receive a data reporting message from a data reporting device, wherein the data reporting message includes a vendor-specific format for a particular data reporting device, and wherein the first network device is configured to provide a data collection micro-service for the vendor-specific format,
add routing data to the data reporting message, wherein the routing data includes a destination for the data reporting message, and wherein the adding creates an encapsulated data reporting message, and
forward the encapsulated data reporting message to a second network device; and
the second network device, the second network device comprising a second communication interface and being configured to:
transform the encapsulated data reporting message into a second format that includes a unified message format, wherein the transforming creates a unified data reporting message,
forward the unified data reporting message toward the destination based on the routing data, and
store a new mapping file for a new data reporting device that has been added to the network, wherein the new data reporting device generates a new type of data reporting message including a third format for the new data reporting device,
wherein the first network device is further configured to:
instantiate a micro-service to receive the new type of data reporting message, and
receive another data reporting message from the new data reporting device, the other data reporting message including the third format for the new data reporting device.

10. The system of claim 9, wherein the first network device is configured to receive data from a type of data reporting device corresponding to the particular data reporting device.

11. The system of claim 9, further comprising:
a third network device in the network, the third network device comprising a third communication interface and being configured to:
add to the other data reporting message different routing data, wherein the adding creates another encapsulated data reporting message, and
forward the other encapsulated data reporting message to the second network device.

12. The system of claim 11, wherein the second network device is further configured to:
transform the other encapsulated data reporting message into the second format that includes the unified message format, wherein the transforming creates another unified data reporting message.

13. The system of claim 9, wherein the second network device is further configured to:
apply the new mapping file to the data reporting message.

14. The system of claim 9, wherein, when sending the unified data reporting message, the second processor is further configured to:
publish the unified data reporting message to a messaging bus for the network.

15. The system of claim 9, wherein the second network device is located in a central processing layer that includes a collection of second network devices located in different geographic regions.

16. A non-transitory computer-readable storage medium storing instructions executable by a processor of a first network element, which when executed cause the first network element to:
receive a data reporting message from a data reporting device, wherein the data reporting message includes a vendor-specific format for a particular data reporting device, and wherein the first network device is configured to provide a data collection micro-service for the vendor-specific format;
add routing data to the data reporting message, wherein the routing data includes a destination for the data reporting message, and wherein the adding creates an encapsulated data reporting message;
forward the encapsulated data reporting message to a second network device, wherein the second network device transforms the encapsulated data reporting message into a second format, based on a unified device data model, that creates a unified data reporting message and forwards the unified data reporting message toward the destination based on the routing data;

store a new mapping file for a new data reporting device that has been added to the network, wherein the new data reporting device generates a new type of data reporting message including a third format for the new data reporting device;

instantiate a micro-service to receive the new type of data reporting message; and receive another data reporting message from the new data reporting device, the other data reporting message including the third format for the new data reporting device.

17. The non-transitory computer-readable storage medium of claim 16, wherein the unified data reporting message supports real-time monitoring.

18. The non-transitory computer-readable storage medium of claim 16, wherein the first network element comprises a virtual network function configured to receive messages from a type of data reporting device corresponding to a particular data reporting device.

19. The non-transitory computer-readable storage medium of claim 16, wherein the data reporting device includes a network device in one of a wireless access network, a core network, or a backhaul network.

* * * * *